(12) United States Patent
Martin et al.

(10) Patent No.: US 9,533,596 B2
(45) Date of Patent: Jan. 3, 2017

(54) ELECTRIC VEHICLE RULE-MAKER

(71) Applicant: FORD GLOBAL TECHNOLOGIES, LLC, Dearborn, MI (US)

(72) Inventors: Douglas Raymond Martin, Canton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 14/156,509

(22) Filed: Jan. 16, 2014

(65) Prior Publication Data

US 2015/0197162 A1    Jul. 16, 2015

(51) Int. Cl.
*B60W 20/00* (2016.01)
*B60L 11/18* (2006.01)
*B60W 50/08* (2012.01)
*B60W 50/14* (2012.01)

(52) U.S. Cl.
CPC .......... *B60L 11/1861* (2013.01); *B60W 20/13* (2016.01); *B60W 20/40* (2013.01); *B60W 50/082* (2013.01); *B60W 50/085* (2013.01); *B60W 50/14* (2013.01); *Y10S 903/903* (2013.01)

(58) Field of Classification Search
CPC ............ B60L 11/1861; B60W 50/082; B60W 50/085; B60W 50/14; B60W 20/40
See application file for complete search history.

(56) References Cited

U.S. PATENT DOCUMENTS

| | | | |
|---|---|---|---|
| 8,217,620 B2 | 7/2012 | Hanssen et al. | |
| 8,543,272 B2* | 9/2013 | Yu | B60W 50/0097 180/65.265 |
| 2008/0059035 A1* | 3/2008 | Siddiqui | B60K 6/445 701/93 |
| 2011/0087390 A1* | 4/2011 | Pandit | B60K 1/00 701/22 |
| 2011/0087391 A1* | 4/2011 | Pandit | B60K 6/485 701/22 |
| 2011/0166733 A1 | 7/2011 | Yu et al. | |
| 2011/0196559 A1* | 8/2011 | Preuss | B60W 20/00 701/22 |
| 2011/0276205 A1* | 11/2011 | Nefcy | B60L 15/20 701/22 |
| 2011/0288712 A1* | 11/2011 | Wang | B60K 6/445 701/22 |
| 2011/0298640 A1 | 12/2011 | Tate, Jr. | |
| 2012/0035795 A1* | 2/2012 | Yu | B60W 50/0097 701/22 |
| 2012/0083951 A1 | 4/2012 | Yang et al. | |
| 2012/0316714 A1* | 12/2012 | Nagayanagi | B60L 7/18 701/22 |
| 2013/0218386 A1* | 8/2013 | Fisker | B60K 6/46 701/22 |

(Continued)

*Primary Examiner* — Thomas G Black
*Assistant Examiner* — Peter D Nolan
(74) *Attorney, Agent, or Firm* — David B. Kelley; Brooks Kushman P.C.

(57) ABSTRACT

A vehicle has a display interface and at least one processor that prompts a user via the display interface to construct a rule specifying circumstances in which the vehicle is to be operated in electric mode using a set of operating/environmental parameters such that the rule includes user specified logic. In response to and while sensed operating/environmental parameters satisfy the rule, the vehicle is operated in electric mode.

8 Claims, 4 Drawing Sheets

(56) References Cited

U.S. PATENT DOCUMENTS

2013/0221928 A1\* 8/2013 Kelty ................... B60L 11/187
                                                      320/134
2014/0046518 A1\* 2/2014 Roos .................... B60W 10/26
                                                       701/22

\* cited by examiner

ELECTRIC VEHICLE RULE-MAKER

TECHNICAL FIELD

The present disclosure relates to systems and methods for controlling an electric machine in an electric vehicle.

BACKGROUND

Battery electric vehicles (BEVs) continuously discharge the traction battery during operation and are not recharged during operation. This continuous discharge of the traction battery in a BEV is commonly referred to as charge-depleting mode. BEVs are normally connected to an external electric power source to recharge the traction battery after depletion. Hybrid electric vehicles (HEVs) are capable of operating in at least two modes; an all-electric mode (charge-depleting mode) and hybrid-vehicle mode (charge sustaining mode). As HEVs are operated in charge-depleting mode, the traction battery is continuously discharged until the traction battery reaches a state of charge in which the vehicle is transitioned to charge sustaining mode. In charge sustaining mode, the vehicle's internal combustion engine and regenerative braking are available to recharge the traction battery or maintain a minimum state of charge. Upon reaching a sufficient state of charge, the HEV may transition back to charge-depleting mode. Plug-in hybrid electric vehicles (PHEVs) have the capability to operate in at least two modes as an HEV, but also have the ability to recharge the traction battery via an external power source. PHEVs use as much pre-saved battery energy as possible until the next battery charge event. After the battery state of charge decreases to a predefined level, the PHEV resumes operation as an HEV in charge sustaining mode.

SUMMARY

In an embodiment, a vehicle having a display interface and at least one processor is provided. The at least one processor is programmed to prompt a user via the display interface to construct a rule specifying circumstances in which the vehicle is to be operated in electric vehicle mode using a set of operating/environmental parameters. The rule includes user specified logic. In response to and while sensed operating/environmental parameters satisfy the rule, the vehicle is operated in electric vehicle mode.

In another embodiment, a vehicle control interface system is provided. At least one processor is programmed to generate output for display indicative of operating/environmental parameters available to create a user-defined rule specifying conditions in which the vehicle is to be operated in electric mode. The control interface system is able to receive operating/environmental parameter and operator input specifying the conditions in which the vehicle is to be operated in electric mode. The control interface system constructs the rule in response to the input and operates the vehicle in electric mode in response to and while sensed operating/environmental parameters satisfy the rule.

In yet another embodiment, a method of controlling a hybrid-electric vehicle is provided. The method includes operating the vehicle in electric mode in response to and while sensed operating/environmental parameters satisfy a user-defined rule.

DETAILED DESCRIPTION

Figure 1:
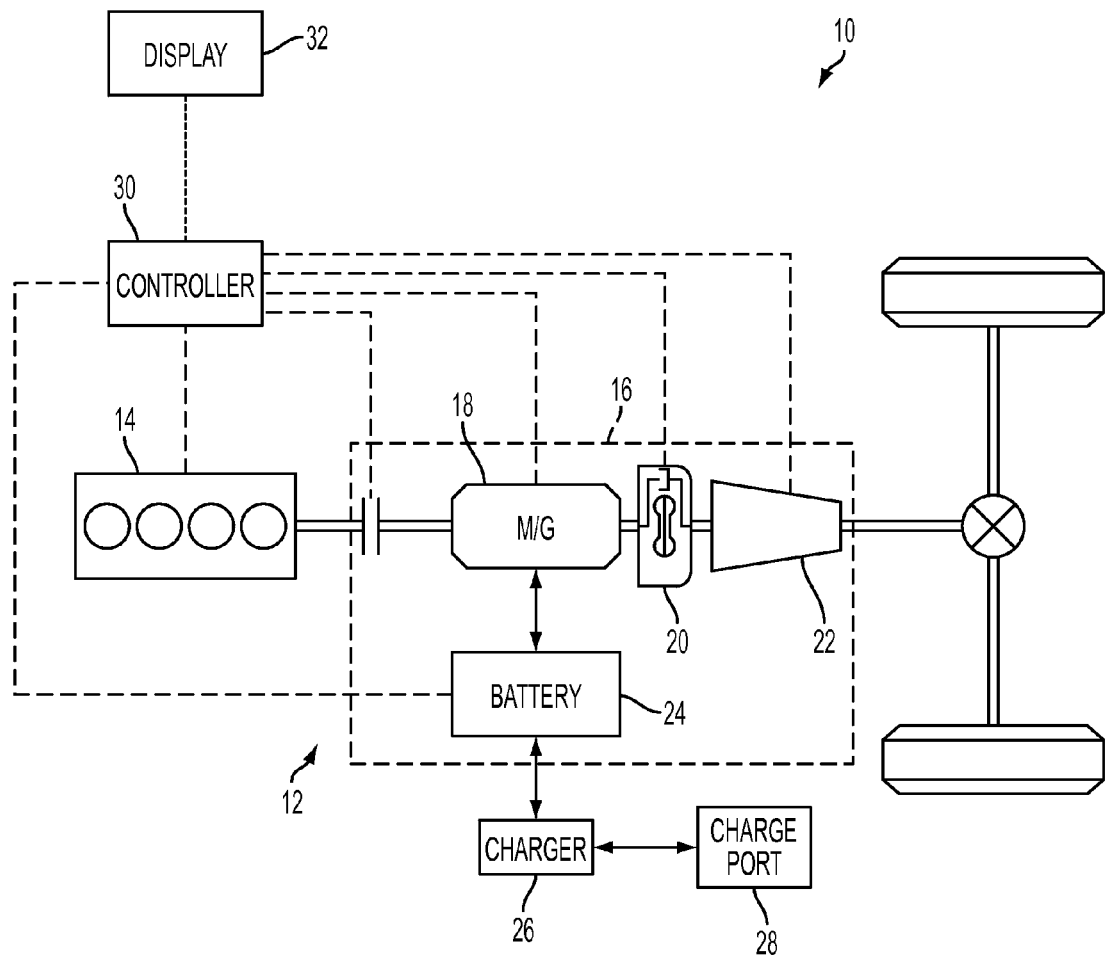
FIG. 1 is a schematic diagram of a hybrid electric vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Hybrid electric vehicles may have two basic operating modes; charge depleting mode (electric vehicle mode) and charge sustaining mode (hybrid-vehicle mode). Plug-in hybrid electric vehicles (PHEVs) may attempt to use as much pre-saved battery electric energy as possible before the next battery charge event. As the battery state of charge decreases below a predefined charge level, the PHEV transitions to charge sustaining mode where the PHEV functions as a traditional hybrid-electric vehicle (HEV).

Experienced users of PHEVs and HEVs may have a different idea of how and when the vehicle is to transition into charge-depleting mode. Some PHEVs and HEVs automatically transition into or out of a charge-depleting mode. These automatic methods are not transparent to the customer and may be frustrating to a customer due to lack of control over how and when the vehicle enters charge-depleting mode. Other PHEVs and HEVs may permit a user to manually enter charge-depleting mode. Manual methods, including pressing an electric vehicle (EV) button, appear fairly low-tech and do not permit a user to customize the experience. Experienced users of PHEVs and HEVs may want to control how and when their PHEVs and HEVs enter charge-depleting mode by defining guidelines or conditions for when their vehicles enter charge-depleting mode.

Drivers of a PHEV or HEV may prefer to operate the vehicle in electric vehicle mode in certain situations. Current methods regarding entering electric vehicle mode involve the vehicle controller automatically transitioning into or out of electric vehicle mode based on the battery state of charge or other operating or environmental parameters that are not transparent to the customer. These automatic methods may be frustrating to experienced users of HEVs or PHEVs, sometimes referred to as "hyper-milers". Hyper-milers attempt to minimize vehicle fuel consumption by altering vehicle parameters and even the vehicle itself.

Manual methods of switching into electric vehicle mode allow a driver to manually select the operating mode of the vehicle. These manual methods include an electric vehicle mode or hybrid vehicle mode switch, button or other selection device. Each driver is unique and may seek to personalize or tailor how and when the vehicle enters into electric vehicle mode for specific situations or scenarios. These manual methods may be viewed as crude or too basic to experienced users of HEVs or PHEVs.

The provision of controls which allow the driver to personalize or tailor how and when the vehicle enters electric vehicle mode may alleviate the frustration with present manual and automatic methods for when the vehicle enters electric vehicle mode. These controls may be implemented through an interface or display system, allowing ease of operation and implementation.

Referring to FIG. 1, a schematic diagram of a PHEV 10 is illustrated according to an embodiment of the present disclosure. Physical placement and orientation of the components within the vehicle may vary. Although the powertrain of FIG. 1 will be particularly described, the strategies in accordance with embodiments of the present disclosure may apply to other powertrain configurations. The PHEV 10 includes a powertrain 12 having an engine 14 that drives a transmission 16. The transmission 16 includes an electric machine such as an electric motor-generator 18, an associated traction battery 24, a torque converter 20, and a gear set 22. The traction battery 24 is rechargeable from an external power source through a charge port 28, via an onboard charger 26, such as an AC/DC converter.

The engine 14 and the motor-generator 18 may both act as drive sources for the PHEV 10. The motor-generator 18 may be implemented by any one of a plurality of types of electric machines. For example, motor-generator 18 may be a permanent magnet synchronous motor.

A controller 30 is in communication with the display interface 32, powertrain 12 and the controller 30 may dictate the vehicle operating mode, automatically or by user request. As a controller commands the PHEV 10 to operate in charge depletion mode, the engine 14 may be isolated from the remainder of the powertrain 12 such that the motor-generator 18 can act as the sole drive source for the PHEV 10, using the traction battery 24 as its power source.

While illustrated as one controller, the controller 30 may be part of a larger control system and may be controlled by various other controllers throughout the vehicle 10, such as a vehicle system controller (VSC). It should therefore be understood that the controller 30 and one or more other controllers can collectively be referred to as a "controller" that controls various actuators in response to signals from various sensors to control functions such as starting/stopping engine 14, operating motor-generator 18 to provide wheel torque or charge the traction battery 24, selecting or scheduling transmission shifts, etc.

The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 30 may communicate signals to and/or from engine 14, powertrain 12, traction battery 24 and display interface 32. Although not explicitly illustrated, those of ordinary skill in the art will recognize various functions or components that may be controlled by the controller 30 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive components such as an alternator, air conditioning compressor, battery charging, regenerative braking, motor-generator operation, clutch pressures for gear set 22, and the like. Sensors communicating input through the I/O interface may be used to indicate turbocharger boost pressure, crankshaft position, engine rotational speed, wheel speeds, vehicle speed, coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter bypass clutch status, deceleration or shift mode, ambient temperature, air conditioning state, vehicle heater state, air conditioning state, for example.

Control logic or functions performed by a controller or at least one processor may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as the controller 30. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 2:
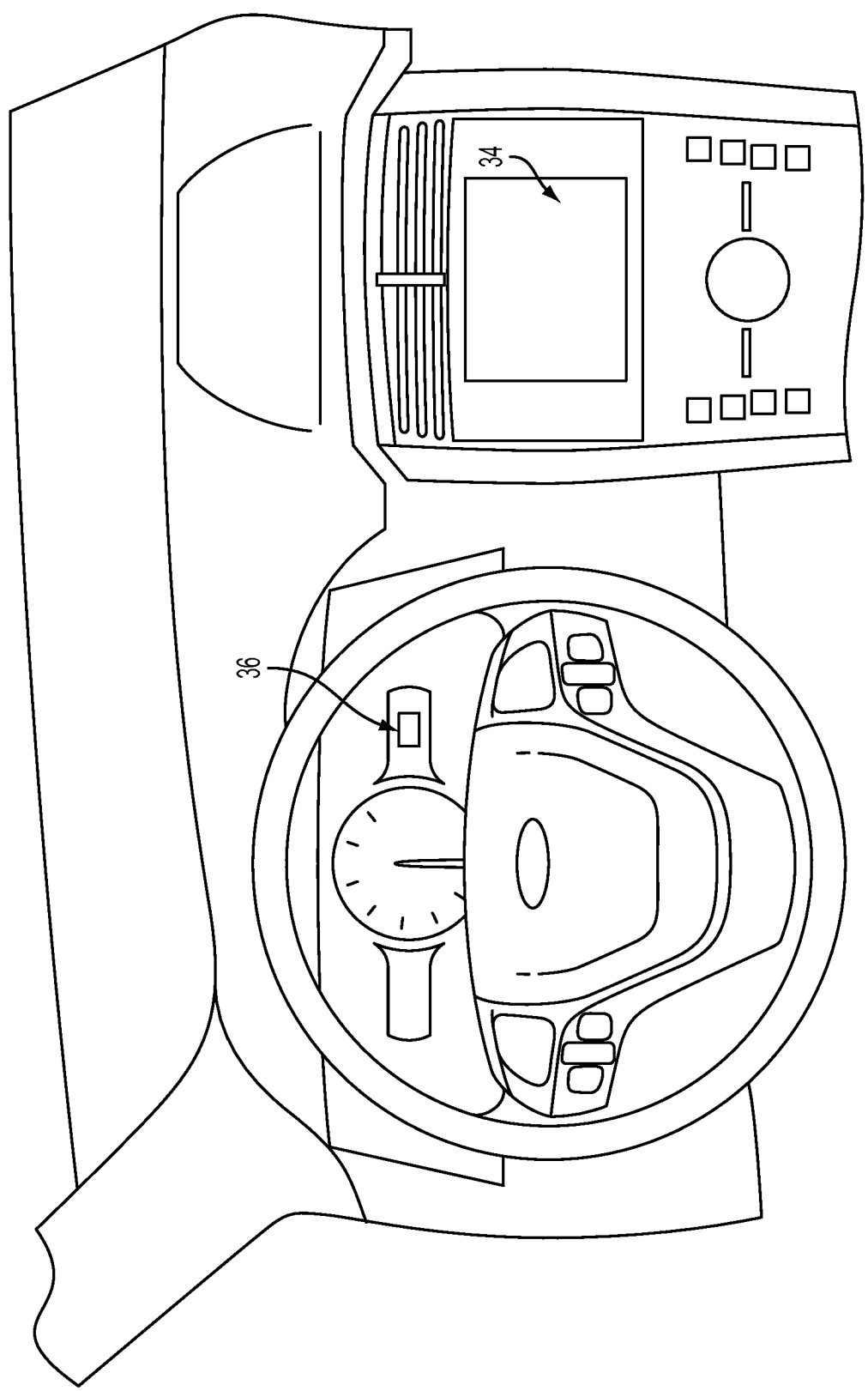
FIG. 2 is an interior view of a vehicle depicting driver display interfaces.

Referring to FIGS. 1 and 2, the controller 30 is programmed to prompt a user via the display interface 32 to construct a rule specifying circumstances in which the vehicle 10 is to be operated in electric vehicle mode. The display interface 32, which may be placed in the center console 34 or instrument cluster 36, visually informs the user of operating/environmental parameters and Boolean operators available to construct a rule using Boolean logic.

In response to and while sensed operating/environmental parameters satisfy the rule, the controller 30 will send a command to operate the vehicle 10 in electric vehicle mode. When the vehicle transitions into electric vehicle mode according to a satisfied rule, the controller 30 displays the implemented rule via the display interface 32. The controller 30 is further programmed to transition the vehicle 10 out of electric vehicle mode in response to a state of charge of the traction battery 24 falling below a threshold value or in response to the sensed operating/environmental parameters no longer satisfying the rule.

A user may also construct additional rules specifying other circumstances in which the vehicle 10 is to be operated in electric vehicle mode. The user may construct the additional rules and select between the available rules via the display interface 32. These available rules may be user-defined or factory pre-set rules.

Figure 3:
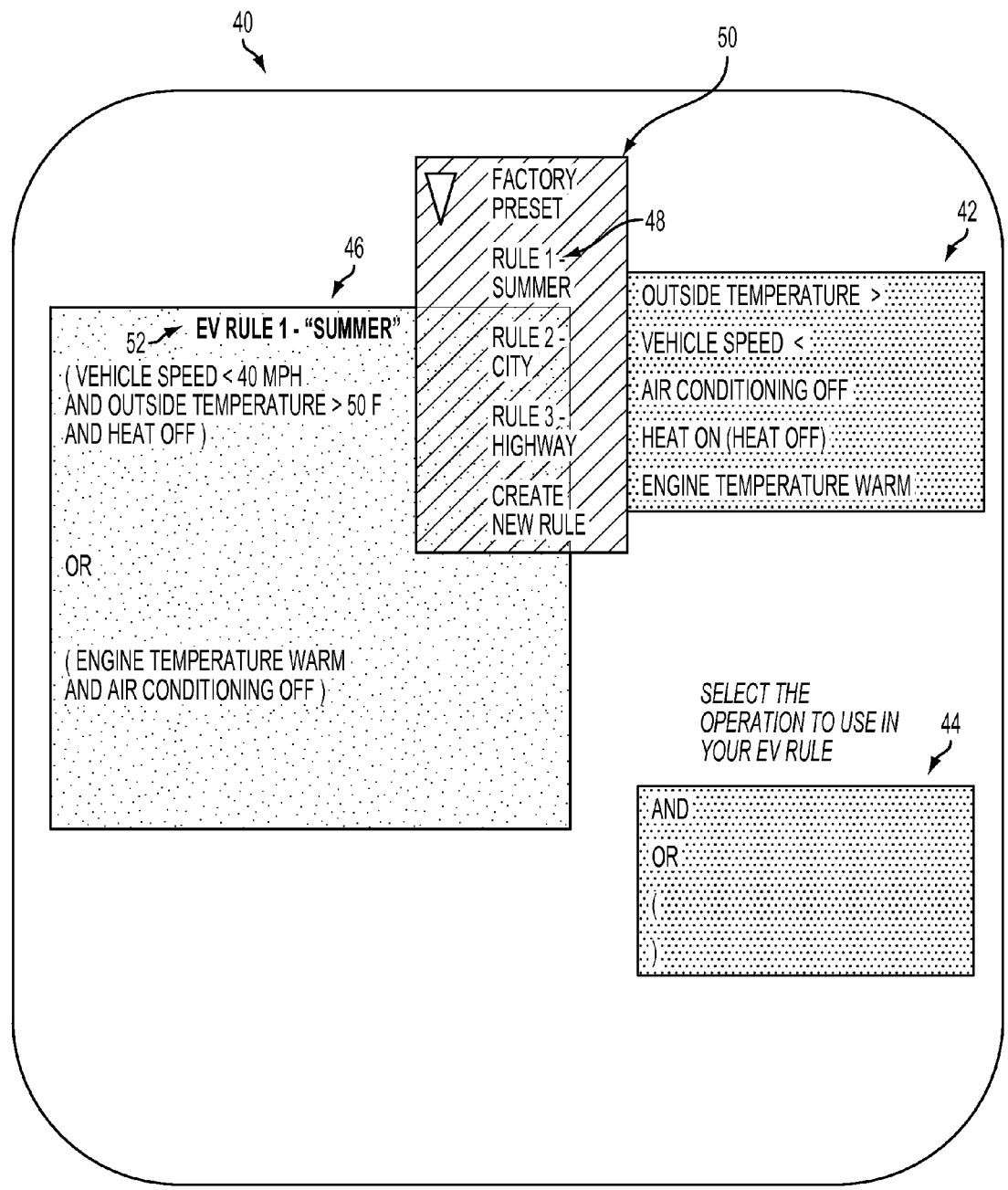
FIG. 3 is a vehicle display interface.

Referring to FIG. 3, a vehicle display control system includes at least one processor in communication with a display 40. The at least one processor is programmed to generate output for the display 40 indicative of operating/environmental parameters 42 and Boolean operators 44 to create a user-defined rule specifying conditions in which the vehicle is to be operated in electric vehicle mode. These operating/environmental parameters 42 may include ambient temperature, vehicle speed, wheel speed, battery temperature, air conditioning state, engine temperature, heater state, and state of charge. The operating/environmental parameters available may be increased as more applications and sensors capable of detecting such parameters are developed. The Boolean operators 44 may include "AND", "OR", "NOT", "<", ">" and "( )". The Boolean operators may be placed between or proximate operating/environmental parameters to construct Boolean logic or logic gates via the display interface 40. The at least one processor is programmed to receive input from the user relating selected operating/environmental parameters 42 using the Boolean operators 44 to create Boolean logic or logic gates defining the rule. The user may then provide a label 46 for the created rule and store the rule.

By way of example, a user may create and store a rule labeled "Rule 1- Summer" specifying the following parameters and logic: (vehicle speed <40 mph AND outside temperature >50 F AND heat off) OR (engine temperature warm AND air conditioning off). A user may also create and store an alternative rule labeled "Rule 2- City" specifying the following parameters and logic: (vehicle speed <30 mph AND air conditioning on AND battery temperature <140 F) OR (battery state of charge NOT <40% AND vehicle speed <35 mph AND heat on). A user may further create and store a rule labeled "Rule 3- Highway" specifying the following parameters and logic: (vehicle speed NOT >65 mph AND battery state of charge >40% AND battery temperature >100 F). The user may also create additional or different rules utilizing various parameters and Boolean operators, provide the rules with a unique identifier and store the rules.

The vehicle may be operated in electric vehicle mode in response to and while sensed operating/environmental parameters satisfy the selected rule. The processor is further programmed to display the rule implemented when the vehicle enters electric vehicle mode 52.

The at least one processor is further programmed to display a pop-up menu 50 containing the user-created and other available rules for the vehicle entering electric vehicle mode. The user may then select a rule, for example "RULE 1 —SUMMER" 48, from the pop-up menu 50. The at least one processor will then transition the vehicle into electric vehicle mode in response to sensed operating/environmental parameters satisfying the selected rule 48.

The at least one processor is further programmed to transition the vehicle out of electric vehicle mode in response to sensed operating/environmental parameters no longer satisfying the selected rule. The at least one processor may transition the vehicle out of electric vehicle mode, for example, in response to a state of charge of a traction battery being less than or equal to a threshold value.

Figure 4:
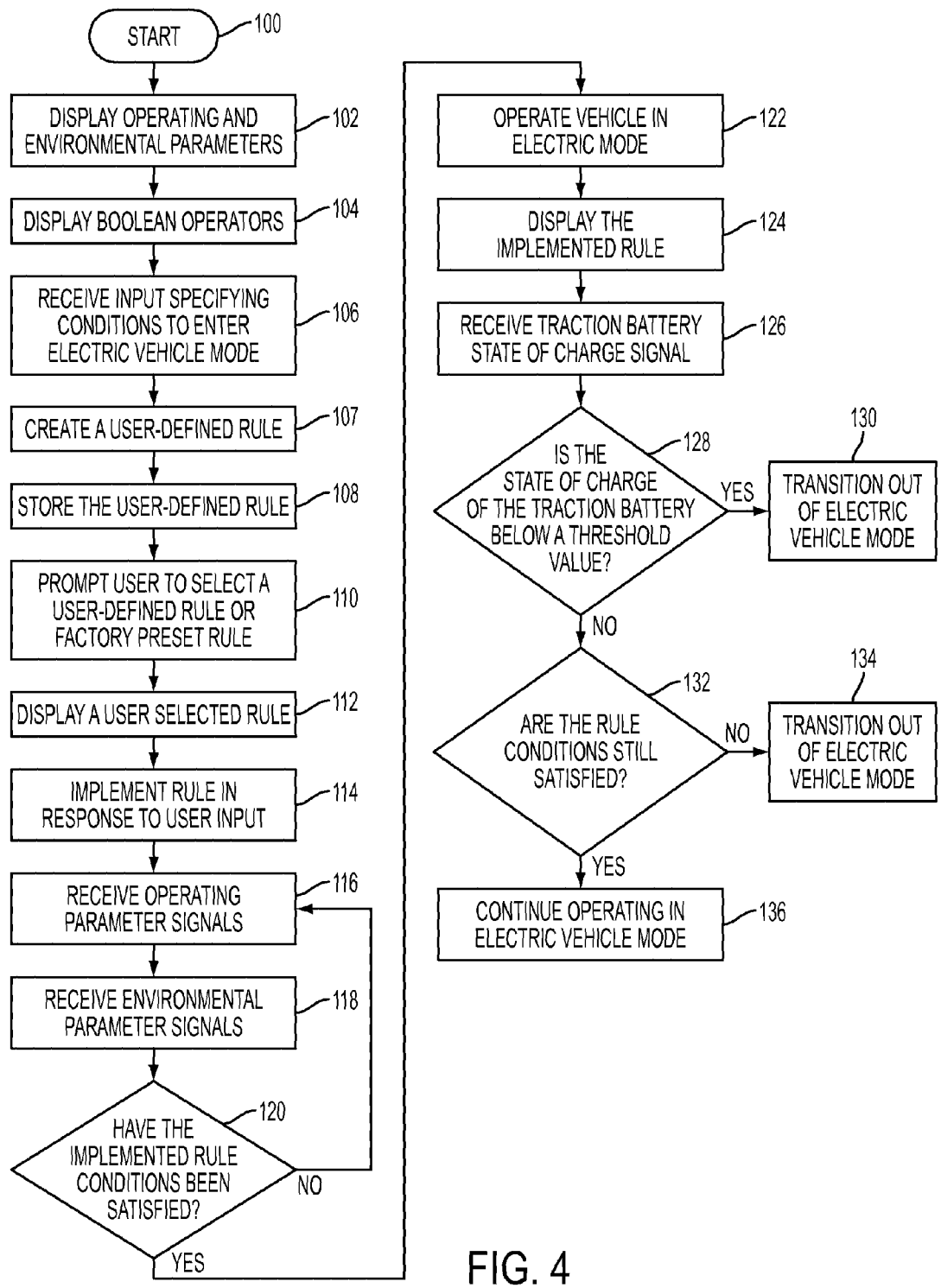
FIG. 4 is a flowchart of a control algorithm.

Referring to FIG. 4, a method of controlling a hybrid-electric vehicle according to an exemplary embodiment of the present disclosure is shown. At least one processor initiates the method as shown in block 100. Operating/environmental parameters are displayed, block 102, as well as Boolean operators, block 104. The at least one processor receives input from a user specifying conditions when the vehicle is to enter electric vehicle mode, block 106. The user is able to input and select operating/environmental parameters and associate the operating/environmental parameters using the Boolean operators displayed to create a user-defined rule, block 107. The at least one processor may then store the user-defined rule, block 108, and prompt a user to select a user-defined rule or factory preset rule for when the vehicle is to enter electric vehicle mode, block 110.

Upon selection of a rule by a user, the at least one processor displays the user selected rule, block 112. The at least one processor implements the selected rule in response to user input, block 114, and awaits a triggering event to operate the vehicle in electric vehicle mode. The at least one processor receives operating/environmental parameter signals from various vehicle sensors or instruments, blocks 116 and 118. The at least one processor must then determine if implemented rule conditions have been satisfied, block 120. Upon the received signals satisfying the implemented rule, the at least one processor commands the vehicle to operate in electric vehicle mode, block 122, and displays the implemented rule, block 124. The at least one processor continues to receive a signal indicative of the state of charge of the traction battery, block 126. The at least one processor then evaluates whether the state of charge of the traction battery is at or below a threshold value, block 128. Should the state of charge of the traction battery be at or below a threshold value, the at least one processor transitions the vehicle out of electric vehicle mode, block 130.

The at least one processor determines whether the rule conditions are still satisfied, block 132. Should the rule conditions no longer be satisfied, the controller transitions the vehicle out of electric vehicle mode, block 134, and operates the vehicle in hybrid-electric vehicle mode. If the rule conditions continue to be satisfied, the at least one processor continues to operate the vehicle in electric vehicle mode, block 136.

The processes, methods, or algorithms disclosed herein can be deliverable to or implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an interface; and
   a processor programmed to
      prompt a user via the interface to construct a rule specifying circumstances when the vehicle is to be operated in electric mode using vehicle performance parameters and user specified threshold values therefor such that the rule includes user specified logic, and
      in response to and while the parameters satisfy the rule, display the rule via the interface and operate the vehicle in electric mode.

2. The vehicle of claim 1 wherein the processor is further programmed to transition out of electric mode in response to a state of charge of a traction battery falling below a threshold value.

3. The vehicle of claim 1 wherein the parameters include vehicle speed, battery temperature, air conditioning state, engine temperature, heater state or state of charge.

4. The vehicle of claim 1 wherein the processor is further programmed to prompt the user via the interface to construct additional rules specifying other circumstances when the vehicle is to be operated in electric mode.

5. The vehicle of claim 1 wherein the processor is further programmed to prompt the user via the interface to select a rule specifying circumstances when the vehicle is to be operated in electric mode.

6. A vehicle control interface system comprising:
   at least one processor programmed to
      generate output for display indicative of parameters describing vehicle performance and available to create a user-defined rule specifying conditions in which a vehicle is to be operated in electric mode;
      receive operator input specifying threshold values for the parameters that define conditions in which the vehicle is to be operated in electric mode;
      construct the rule in response to the input; and
      in response to and while the parameters satisfy the rule, generate output for displaying the rule and operate the vehicle in electric mode.

7. The vehicle control interface system of claim 6 wherein the at least one processor is further programmed to transition out of electric mode in response to a state of charge of a traction battery falling below a threshold value.

8. The vehicle control interface system of claim 6 wherein the at least one processor is further programmed to transition out of electric mode in response to and while the parameters do not satisfy the rule.

* * * * *